United States Patent
Tsunoda et al.

(10) Patent No.: US 6,436,465 B1
(45) Date of Patent: Aug. 20, 2002

(54) EXTRUSION COATING METHOD

(75) Inventors: Eizo Tsunoda; Yutaka Shimizu; Masujiro Seki; Naomi Yoshiike; Kazuo Katai; Katsumi Onozawa, all of Nagano (JP)

(73) Assignee: TDK Corporation, Tokyo (JP)

( * ) Notice: Subject to any disclaimer, the term of this patent is extended or adjusted under 35 U.S.C. 154(b) by 1391 days.

(21) Appl. No.: 08/738,469

(22) Filed: Oct. 30, 1996

Related U.S. Application Data

(63) Continuation of application No. 08/407,258, filed on Mar. 20, 1995, now abandoned, which is a continuation of application No. 08/120,783, filed on Sep. 15, 1993, now abandoned.

(30) Foreign Application Priority Data

Sep. 17, 1992 (JP) .............................................. 4-273851

(51) Int. Cl.⁷ ................................................ B05D 5/12
(52) U.S. Cl. .......................... 427/8; 427/356; 427/359; 427/361
(58) Field of Search .......................... 427/8, 9, 10, 130, 427/356, 359, 361; 118/106, 110, 112, 118, 410, 411, 412, 413, 414, 668, 688, 690

(56) References Cited

U.S. PATENT DOCUMENTS

| | | | | |
|---|---|---|---|---|
| 3,304,910 A | * | 2/1967 | Warner ....................... | 427/356 |
| 3,680,529 A | * | 8/1972 | Francis ....................... | 118/672 |
| 4,332,840 A | * | 6/1982 | Tanaka et al. ............... | 427/130 |
| 4,340,621 A | | 7/1982 | Matsumiya et al. | |
| 4,537,801 A | * | 8/1985 | Takeda ....................... | 427/356 |
| 4,729,858 A | | 3/1988 | Chino et al. | |
| 4,831,961 A | | 5/1989 | Chino et al. | |
| 4,899,691 A | * | 2/1990 | Fitzgerald, Jr. et al. ..... | 118/665 |
| 4,982,687 A | | 1/1991 | Takahashi et al. | |
| 5,028,450 A | * | 7/1991 | Naka et al. ................. | 118/410 |
| 5,202,164 A | * | 4/1993 | Takahashi et al. .......... | 118/413 |

FOREIGN PATENT DOCUMENTS

| | | | |
|---|---|---|---|
| JP | 0001627 | * | 1/1985 |
| JP | 62 95169 | | 5/1987 |
| JP | 2 229572 | | 9/1990 |
| JP | 2229572 | * | 9/1990 |

\* cited by examiner

*Primary Examiner*—Brian K. Talbot
(74) *Attorney, Agent, or Firm*—Oblon, Spivak, McClelland, Maier & Neustadt, P.C.

(57) ABSTRACT

A magnetic paint is extrusion coated to a length of splice jointed webs through a coating head by continuously feeding the length of webs across the head. When a splice joint passes across the head, the head is moved apart from the web before passage and contacted with the web after passage. Objectionable coating portions which are formed as a result of moving the head out of and into contact with the web are scraped off by a scraping roll downstream of the head.

6 Claims, 1 Drawing Sheet

EXTRUSION COATING METHOD

This application is a Continuation of application Ser. No. 08/407,258, filed on Mar. 20, 1995, now abandoned which is a continuation of application Ser. No. 08/120,783, filed Sep. 15, 1993, also abandoned.

BACKGROUND OF THE INVENTION

1. Field of the Invention

This invention relates to a method for extrusion coating a coating composition to a length of splice jointed webs through a coating head.

2. Prior Art

A variety of systems have been employed for coating magnetic layers on supports to form magnetic recording tape. Roll coating techniques using reverse and gravure rolls are traditional. There is a transition from the roll coating techniques to coating techniques using extrusion coating heads for the reasons of higher productivity and ease of operation.

The technique of coating magnetic paint using an extrusion coating head includes forming a uniform wet film through a slit in the head, continuously transferring the wet film to a length of webs and drying the film to form magnetic recording tape.

One of problems associated with this technique is how to pass splice joints across the coating head. More particularly, where it is desired to continuously coat webs with magnetic paint, it is preferred to splice joint a series of webs, that is, connect the trailing end of one web to the leading end of a subsequent web such that the length of spliced jointed webs can be continuously fed across the head. Then the coating operation can be continued without interruption. The webs are generally connected to each other by joining the trailing end of an upstream or old web to the leading end of a downstream or new web with double adhesive tape. Although a remaining trailing portion of the upstream web is generally cut off after adhesive joining, a trailing edge portion of the upstream web which extends from the joint over a length of about 20 to 30 cm is left unadhered, just like a "tail". Then as the length of webs is fed along the coating and drying sections, the free end or tail portion makes free motion relative to the adjacent web without being fixedly attached to the moving web.

In one case, the "tail" is present on the extrusion coating head side. If extrusion of magnetic paint is continued even during passage of the splice joint across the head, the paint is coated to the "tail" and then released and scattered therefrom due to the free motion of the "tail" induced by the running of the web, depositing on and contaminating the coating along the line or system components.

In another case, the "tail" is present on an opposite side to the extrusion coating head. At the splice joint that is the web overlapped portion, there is a step corresponding to the total thickness of adhesive tape and downstream web. If extrusion of magnetic paint is continued even during passage of the splice joint across the head, the paint is accumulated at the step. Since this accumulated paint cannot be fully dried in the subsequent drying step, there is left an under-dried portion leading to a coating defect. In addition, the paint can penetrate into the overlapped splice joint to cause the joint to be detached, resulting in disconnection of webs.

Therefore, where a length of splice jointed webs is continuously coated with a coating composition, it is preferred to interrupt extrusion of the composition from the head or to move the head apart from the webs during passage of the splice joint across the head so that the webs are not coated in the vicinity of the splice joint.

Several problems arise in the extrusion system designed such that extrusion of the composition from the head is interrupted during passage of the splice joint across the head. As described in Japanese Patent Application Kokai (JP-A) No. 95169/1987, since the coating head is kept in direct contact with the webs during passage of the splice joint across the head, chips of the web can deposit on the coating head, the webs can be scratched, or the webs can be electrically charged to bear electrostatic charges which can invite flash explosion in an organic solvent vapor atmosphere. Therefore, it is recommended to immediately move apart the web and the coating head when extrusion of the coating composition is interrupted.

When the coating head and the web are spaced apart during passage of the splice joint across the head, JP-A 95169/1987 employs the successive steps of interrupting extrusion of the coating composition through a slit of the head before passage of the splice joint across the head, moving the coating head and the web apart from each other, bringing the coating head and the web into mutual contact after passage of the splice joint across the head, and thereafter restarting extrusion of the coating composition from the head. This process still has some problems. Even when the discharge force for extruding the coating composition is shut off before passage of the splice joint across the head, some time will pass until extrusion of the composition is substantially interrupted. A portion of the web which is fed past the coating head during this time lag is coated to deficient thickness and must be discarded, resulting in a lowering of production yield. In addition, when extrusion of the coating composition from the head is restarted after re-contact between the web and the head, the discharge force for extrusion instantaneously acts on the web to temporarily move the web apart from the head beyond an optimum spacing, resulting in a thicker coating.

Moreover, solid dispersion type coating compositions such as magnetic paint tend to agglomerate and precipitate when allowed to stand. If such a partially agglomerated and precipitated coating composition is extruded at the restart of coating, the agglomerate or precipitate can clog the slit or the head-web spacing, resulting in coating defects including non-uniform coating thickness and longitudinal streaks on the coating surface.

Then in the method of JP-A 229572/1990, extrusion of a coating composition is not interrupted even when the web and the coating head are moved apart during passage of the splice joint across the head. The resulting thickly built-up coating is controlled at a downstream position. This method in which extrusion of the composition is not interrupted tends to form a coating of varying thickness both when the coating head and the web are moved apart and when the coating head and the web are contacted again since the head-web spacing varies at these instants. For example, when the coating head and the web are moved apart, the head-web spacing is increased to allow for formation of a locally thicker coating. The application of the composition to the web is continued until the coating head and the web are fully moved apart. When the coating head and the web are contacted again, there is some accumulation of the composition about the slit outlet of the head due to continued extrusion of the composition from the head during spacing apart of the head from the web. If the coating head and the web are contacted in this state, the composition newly extruded from the head is coated to the web together with the composition accumulated about the slit outlet, resulting in a thicker coating. Such a thicker coating is formed until the head-web spacing is stabilized.

Such unacceptable coating thickness variations lead to various product defects. Coatings thicker than the predetermined value not only lead to quality defects, but also leave wet portions due to under-drying. Under-dried paint will adhere to support rolls, guide rolls and other components along a line downstream of the drying section and transfer to the normal paint coating, leading to serious coating defects including dropouts and stains.

In this regard, JP-A 229572/1990 proposes to level such thickly coated portions by means of a smoother disposed downstream of the coating head so as to restrict the coating to the predetermined thickness. For a duration from the initial contact of the coating head with the web until the position of the coating corresponding to the point of time when the head-web spacing is stabilized goes past the smoother location, the smoother is at a close spacing to the web for restricting the thick paint coating to a predetermined uniform thickness. Thereafter, the smoother is fully spaced apart from the web, and normal coating operation is resumed.

This approach, however, often fails to achieve the predetermined thickness. The smoother is effective for reducing the thick paint coating to a thickness thinner than the coated thickness, but difficult to precisely control the coating thickness to the predetermined thickness, leaving a possibility of under-drying. Since the excessive amount of the coating composition causing a thicker coating varies every time, some extra coating composition can be left ahead of the smoother and on the web without being uniformed, particularly when a larger excess is applied. When the smoother is fully spaced apart from the web after the head-web spacing resumes a normal state, this extra mass can be transferred to the web to form a thicker coating which can be left wet after drying. These problems become serious at higher coating speeds. There is a desire to overcome these problems to provide a more efficient manufacture process.

SUMMARY OF THE INVENTION

An object of the present invention is to provide a method and apparatus for extrusion coating a magnetic paint to a length of splice jointed webs through a coating head which is designed so as to inhibit any failure resulting from an objectionable coating which can be formed upon passage of the splice joint across the head.

The present invention provides a method for extrusion coating a coating composition to a length of splice jointed webs through a coating head by feeding the length of webs across the coating head to form a coating on the webs. Each web has a splice joint at the trailing edge thereof. The coating head is moved apart from a web before the splice joint passes across the head, and brought in contact with a subsequent web after the splice joint has passed past the head. Objectionable coating portions are formed as a result of moving the coating head out of and into contact with the webs. The improvement is achieved by stripping off the objectionable coating portions from the webs at a position downstream of the head.

The composition is most often a magnetic paint.

Preferably, the stripping step is interrupted when the thickness of the coating reaches a predetermined value. The stripping step is by scraping off the objectionable coating portions from the webs. Extrusion of the composition through the coating head is continued even when the splice joint passes across the head.

In another aspect, the present invention provides an apparatus for extrusion coating a coating composition to a length of splice jointed webs, each web having a splice joint at the trailing edge thereof. The apparatus includes a head for extrusion coating the coating composition to the length of webs, a means for feeding the length of webs across the head, and a means for moving the head apart from a web before the splice joint passes across the head and bringing the head in contact with a subsequent web after the splice joint has passed past the head. Objectionable coating portions are formed as a result of moving the head out of and into contact with the webs. A means is disposed downstream of the head for stripping off the objectionable coating portions from the webs.

Preferably, the apparatus further includes a control for moving the stripping means into contact with the web for stripping when the objectionable coating portions pass across the stripping means and thereafter moving the stripping means apart from the web for interrupting the stripping step. The stripping means includes a scraping roll for scraping off the objectionable coating portions from the webs and means associated with the scraping roll for removing the scraped composition from the roll. The scraping roll is reversely rotated with respect to the feed direction of the webs. Extrusion of the composition through the head is continued even when the head is moved apart from the webs.

BRIEF DESCRIPTION OF THE DRAWING

The only FIGURE.

DESCRIPTION OF THE PREFERRED EMBODIMENT

Figure 1:
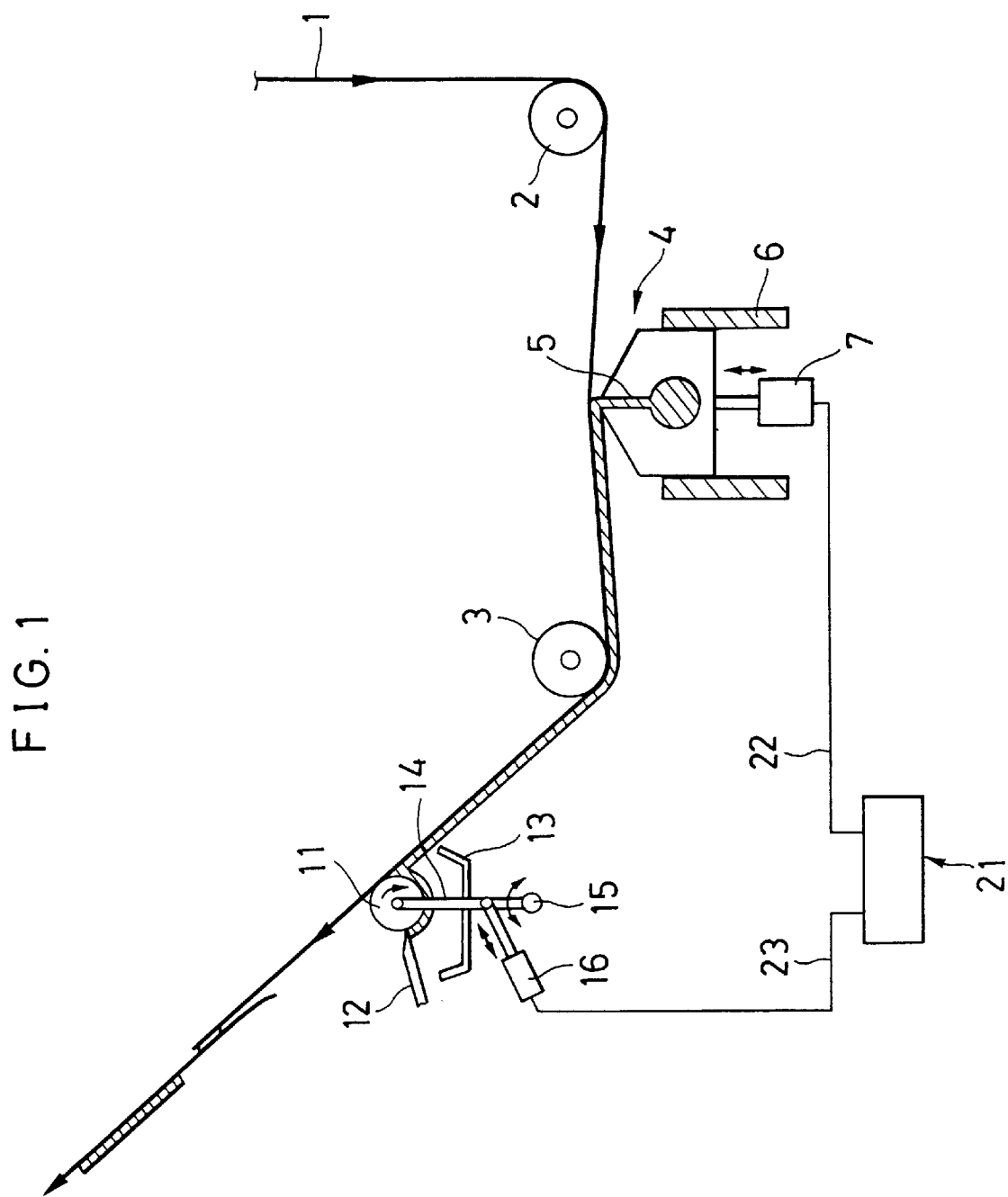
FIG. 1 is a schematic illustration of a coating apparatus according to one embodiment of the invention.

According to the invention, a length of serially splice jointed webs is continuously fed across an extrusion coating head whereby a coating composition is continuously applied to the webs from the head to form a coating on the webs.

Each web used herein is a base film having a thickness of 5 to 200 µm, a width of 30 mm to 3,000 mm and a length of 200 to 30,000 m and made of any desired resin, typically polyethylene terephthalate (PET). If desired, the web has an undercoat layer pre-coated thereon. A series of webs are splice jointed by connecting the trailing end of one web to the leading end of a subsequent web through double adhesive tape.

The coating composition used herein may contain various dispersoids such as pigments and various vehicles. It may also contain magnetic powder which is generally of needle or plate shape. The coating composition itself has non-Newtonian flow characteristics and hence, high structural viscosity. More often than not, the coating composition used herein is a magnetic coating composition because the best results are achieved with the present invention.

The magnetic coating composition or magnetic paint for use in magnetic recording media generally contains a magnetic powder, binder and solvent. The magnetic powder which can be used herein includes oxide fine powders such as $\gamma$-$Fe_2O_3$, cobalt-containing $\gamma$-$Fe_2O_3$, $Fe_3O_4$, cobalt-containing $Fe_3O_4$, $CrO_2$, barium ferrite, and strontium ferrite, fine powders of metals and alloys thereof such as Fe, Co, and Ni, and iron carbide. Any of well-known resins may be used as the binder. The solvent which can be used herein is not critical and a suitable solvent may be selected for a particular purpose from ketones such as cyclohexanone, methyl ethyl ketone, and methyl isobutyl ketone, and aromatic solvents such as toluene. The magnetic powder is contained in the magnetic paint such that the magnetic layer coated therefrom contains 30 to 92% by weight of the magnetic powder in dry state while it is about 0.1 to 6 μm thick. The magnetic paint contains various additives such as inorganic fine particles and lubricants if desired.

Referring to FIG. 1, there is illustrated a coating apparatus for continuously feeding a length of webs across a coating head for applying magnetic paint to the webs.

A feed roll (not shown), guide rolls 2 and 3 and a takeup roll (not shown) are suitably arranged to define a path along which a web 1 is longitudinally fed in an arrow direction. A coating head 4 having a slit 5 for extruding magnetic paint therethrough is located between the support rolls 2 and 3 and on an opposite side to the rolls 2 and 3 with respect to the web path. The slit 5 extends transverse to the web 1. The coating head 4 is movably mounted between guide rails 6 and operably connected to a drive 7 so that the head 4 is movable back and forth along the guide rails 6. The coating head 1 is upright or faces upward in FIG. 1 although it may be faced downward or sideways or skewed depending on its structure and a web transfer system combined. A scraping means is located in the vicinity of the web path and downstream of the guide roll 3. The scraping unit includes a scraping roll 11, a doctor blade 12, a pan 13, a support rod 14, and a drive 16. The scraping roll 11 is rotatably mounted at one end of the support rod 14 which is pivoted at 15. The drive 16 has an actuating arm pivotally connected to the support rod 14 at an intermediate so that upon actuation of the drive, the support rod 14 is turned about the pivot 15 and the scraping roll 11 is moved toward and away from the web 1. The drives 7 and 16 may be pneumatic cylinders, hydraulic cylinders or electric motors. A control 21 for controlledly moving the coating head 4 and the scraping roll 11 is connected to the drives 7 and 16 through cables 22 and 23, respectively, as will be described in more detail later.

In a normal coating period excluding the passage of a splice joint, as the web 1 is continuously fed along support rolls 2 and 3 in an arrow direction, the coating head 4 extrudes and applies the magnetic paint to one surface of the web 1. The web 1 is then fed past the support roll 3 and the scraping means. The scraping roll 11 is spaced apart from the web 1 in this normal coating period. The web 1 then passes a magnetic field orientation step and a drying step (not shown) before it is wound on the takeup core.

As the web is continuously coated, the splice joint at the trailing edge of that web eventually approaches to the coating head 4. At this point, a signal notifying the approach of the splice joint is delivered to the control 21. Then the control 21 delivers control signals to the coating head drive 7 and scraping roll drive 16 through the cables 22 and 23, the control signals indicating the timing and direction of movement of the head and the roll.

The signal notifying the approach of the splice joint may be generated by any desired means, for example, manually by the operator, by calculation of the travel distance of the web, or by locating an optical, magnetic or electric sensor in the web path upstream of the coating head so that the sensor may generate a signal when the splice joint passes thereacross.

The control signals delivered to the drives 7 and 16 indicate the timing and direction of movement of the associated members. More particularly, the control signal delivered to the coating head drive 7 gives a command thereto for moving the coating head 4 away from the web 1 path just prior to the passage of the splice joint. Then the coating head 4 is moved away from the web 1. There can be formed an objectionable coating as a result of moving the head apart from the web. At substantially the same time, the control signal delivered to the scraping roll drive 16 gives a command thereto for moving the scraping roll 11 into contact with the web 1 for scraping off the objectionable paint coating before it moves past the scraping roll 11. At this point, the doctor blade 12 is in continuous contact with the scraping roll 11 for removing the scraped paint from the roll 11 down onto the pan 13. The objectionable coating means a magnetic paint coating portion which is thicker than the predetermined thickness range achieved during normal coating operation.

The scraping roll 11 is rotated in a reverse direction (shown by an arrow) to the web feed direction by means of a drive motor (not shown). By imparting a reverse rotational force, the magnetic paint thickly coated to the web 1 is smoothly scraped off and transferred to the scraping roll 11. Any desired means may be used for imparting such a reverse rotational force to the scraping roll 11. The drive means can be controlled such that it exerts a reverse rotational force only when the scraping roll 11 is brought in contact with the web 1.

Usually the scraping roll 11 is rotated at a circumferential speed of 0.3 to 3.0 times, preferably 0.5 to 2.0 times, more preferably 0.7 to 1.3 times the feed speed of the web 1. If the roll circumferential speed is too high, the doctor blade 12 would not effectively remove off the scraped paint or would be prematurely worn out. If the roll circumferential speed is too low, more magnetic paint being scraped from the web 1 would accumulate on the roll, resulting in deficient scraping of the magnetic paint coating. The force of urging the scraping roll 11 to the web 1 may be empirically determined for a particular web feed speed as a sufficient pressure to transfer all the (objectionable) magnetic paint coating from the web 1 to the scraping roll 11

In this way, the magnetic paint coating is scraped off from the web 1 by the scraping roll 11. It suffices that substantially all the magnetic paint coating is scraped off although it is preferred that the magnetic paint coating is completely removed. Instead of the scraping roll unit illustrated herein, there may be used any desired stripping/removing means. For example, the operator can manually wipe off the magnetic paint using a doctor blade or non-woven fabric although an unmanned mechanical means for effectively scraping, stripping and removing the magnetic paint is preferred. In order to prevent the once scraped off paint from depositing again, a transfer stripping means like the scraping roll 11 combined with the doctor blade 12 is preferably used.

Contact of the scraping roll 11 with the web 1 transfers the objectionable or thickly coated magnetic paint coating from the web 1 to the roll 11 whereupon the transferred paint is scraped off again from the roll 11 by the doctor blade 12 and falls down on the pan 13. By removing the transferred paint from the roll 11 by the doctor blade 12, coating defects are further decreased. The secondary removal or scraping of paint from the scraping roll 11 may also be carried out-by wiping with non-woven fabric although the doctor blade is most preferred because of simple structure and ease of maintenance.

After the splice joint has passed past the coating head and the scraping means, a signal representing the departure of the splice joint is generated and delivered to the control 21 which in turn, delivers a signal to the drive 7 for moving the coating head 4 toward the web 1 for bringing the head 4 in contact with the web 1.

The signal representing the passage of the splice joint may be generated by any desired means like the signal notifying the approach of the splice joint, for example, manually by the operator, by calculation of the travel distance of the web, or by locating an optical, magnetic or electric sensor in the web path downstream of the coating head so that the sensor may generate a signal when the splice joint passes thereacross.

Preferably, the scraping roll 11 is brought into contact with the web 1 for scraping an objectionable paint coating portion before the passage of the splice joint, then spaced apart from the web 1 when an uncoated portion resulting from spacing of the coating head 4 from the web 1 passes thereacross, partially for the purpose of preventing break of the web 1, and again brought into contact with the web 1 for scraping an objectionable paint coating portion resulting from re-contact of the coating head 4 with the web 1 before that objectionable coating portion passes across the scraping roll 11. However, it is acceptable to maintain the scraping roll 11 in continuous contact with the web 1 during the period associated with passage of the splice joint.

Signals for spacing the scraping roll 11 apart from the web 1 during passage of an uncoated portion of the web 1 thereacross and bringing the roll 11 in contact with the web 1 again thereafter may be obtained by using the signal notifying the approach of the splice joint and the signal representing the passage of the splice joint in combination with a timer or the like. By properly setting the timer, it is possible to controlledly bring the scraping roll 11 out of and into contact with the web 1. It is also possible to detect the uncoated portion of the web by means of a sensor or the like.

When the thickness of the incoming paint coating reaches the predetermined value at the contact point, the control 21 delivers a signal to the drive 16 for moving the scraping roll 11 apart from the web 1. The scraping roll 11 which has been brought into contact with the web 1 again is spaced apart from the web 1. After the roll 11 is spaced apart, the system resumes the normal coating state.

A signal for finally moving the scraping roll 11 apart from the web 1 may be generated by any desired means, for example, after the lapse of a certain time from the re-contact of the coating head 4 with the web 1. In this regard, a timer circuit may be built in the control 21 or provided separately, the time taken until a normal coating state is resumed after the re-contact of the coating head 4 with the web 1 is empirically determined for a particular set of conditions, and the timer is set to the determined time. Alternatively, a sensor for detecting that the paint coating has the predetermined thickness is located upstream of the scraping roll 11 so that a spacing-apart signal may be generated after it is detected that the paint coating has resumed the predetermined thickness.

Another means for generating a signal for finally moving the scraping roll 11 apart from the web 1 is to detect a variation in the flow rate of the coating composition through the slit 5 of the coating head 4 and to generate the signal when the variation is converged within a predetermined narrow range. When the coating head 4, which has been spaced apart from the web 1, is contacted with the web 1 again, the flow of the coating composition from the slit 5 is obstructed so that the flow rate of the coating composition varies to a value different from that during the normal coating state. As the coating conditions approach the normal coating state, the flow rate of the coating composition exiting from the slit 5 also approaches to the normal flow rate. The narrow range into which the variation in flow rate should fall before the signal is generated can be empirically determined for a particular set of coating conditions.

The control 21 for controlling and delivering such signals is not limited in construction or circuit insofar as it has functions of controlling the above-mentioned operations and may be suitably selected in accordance with the situation and the state of the art. Instead of the control 21, the operator or suitable sensors may be used to generate signals which are delivered to the drives 7 and 16, optionally in combination with timers.

It will be understood that FIG. 1 corresponds to an situation wherein after the splice joint is fed past the coating head 4, an objectionable paint coating portion which results from the re-contact of the head 4 with the web 1 until the coating thickness is stabilized to the predetermined value is scraped off by the scraping roll 11 located downstream of the head 4.

In the illustrated embodiment, the coating head 4 and scraping roll 11 is moved toward and away from the web 1 provided that the web 1 passes along the fixed path and the head and roll 11 are movable relative thereto. However, the present invention only requires mutual contact and spacing between the web 1 and the coating head 4 and between the web 1 and the scraping roll 11. For example, the web 1 may be moved toward and away from the coating head 4 or the scraping roll 11 by moving the guide rolls 2 and 3 or the like. It is also possible that both the web 1 and the coating head 4 or the scraping roll 11 be movable. A choice may be made in accordance with the structure of a particular system and the situation.

Preferably the web 1 is fed at a rate of at least 50 m/min. , more preferably 200 to 1,000 m/min. when it is desired to achieve a coating thickness of 0.3 to 6 μm in dry state. More benefits of the invention are obtained at such high speed feed. The coating may have a multi-layer structure.

EXAMPLE

Examples of the present invention are given below by way of illustration and not by way of limitation.

There was prepared a magnetic paint of the following composition.

| Ingredients | Parts by weight |
| --- | --- |
| Cobalt-containing γ-$Fe_2O_3$ | 100 |
| Polar group-containing vinyl chloride-acrylate copolymer | 15 |
| Sulfonate-containing polyurethane resin | 6 (solids) |
| Dispersant | 1.5 |
| Stearic acid | 1 |
| Butyl stearate | 1 |
| α-alumina | 2 |
| Methyl ethyl ketone | 160 |
| Toluene | 150 |
| Cyclohexanone | 100 |
| Curing agent (50% C-3041NV manufactured by Nippon Polyurethane K.K.) | 8.4 |

A length of two splice jointed PET webs each having a width of 520 mm and a length of 12,000 m was fed at a speed of 300 m/min. and the magnetic paint was coated thereto to form a paint coating of 3.2 μm thick in dry state.

Example 1

According to the method of the invention, the magnetic paint was coated by moving the coating head apart from the web when the splice joint passed thereacross. The time of moving the coating head apart from the web was 10 seconds. At the same time the scraping roll was brought into contact with the web for scraping off objectionable paint coating portions while reversely rotating the scraping roll at a circumferential speed of 210 m/min. or 0.7 times the web feed speed.

The thus coated web was further processed in a conventional manner and evaluated by standard tests.

The finished web was severed to a width of ½ inches. A sample tape including a portion where the coating thickness resumed the predetermined value immediately after passage of the splice joint across the coating head was assembled in a VHS cassette, and color bar signals were recorded therein in a conventional manner. Using a Model VH4-1BZ dropout counter (manufactured by Shibasoku K. K. ), the signals were reproduced for counting the number of dropouts within 60 seconds, the dropout being an output drop of −20 dB continued for 15 $\mu$sec. or longer.

In addition, the coated web was inspected whether or not any wet portion was left in the coating. Also determined was the objectionable length which was the sum of objectionable coating portions bridging the splice joint and having a thickness outside the predetermined thickness range and uncoated portion.

Example 2

The same coating operation as in Example 1 was repeated except that the scraping roll was rotated at a circumferential speed of 390 m/min. or 1.3 times the web feed speed. The sample was examined by the same tests as in Example 1.

Comparative Example 1

The same coating operation as in Example 1 was repeated except that the scraping roll was omitted and objectionable paint coating portions were subjected to conventional coating thickness control by means of a smoother. The sample was examined by the same tests as in Example 1.

Comparative Example 2

The same coating operation as in Example 1 was repeated except that coating thickness control by the scraping roll on objectionable paint coating portions was omitted. The sample was examined by the same tests as in Example 1.

Comparative Example 3

The same coating operation as in Example 1 was repeated except that coating thickness control by the scraping roll on objectionable paint coating portions was omitted and extrusion of the magnetic paint was interrupted when the coating head was spaced apart from the web. The sample was examined by the same tests as in Example 1.

The results are shown in Table 1.

TABLE 1

| Example | Dropouts (counts/min.) | Objectionable length (m) | Wet portion |
|---|---|---|---|
| E 1 | 1.3 | 65 | none |
| E 2 | 0.9 | 65 | none |
| CE 1 | 8.0 | 65 | found |
| CE 2 | 11.7 | 65 | found |
| CE 3 | 0.9 | 100 | none |

It is evident that Examples 1 and 2 are effective in restraining dropouts, preventing any paint coating from being left wet, and minimizing the objectionable length. Advantageous coating performance is thus attested.

There has been described a method for extrusion coating magnetic paint to a length of splice jointed webs through a coating head in such a manner as to avoid any deleterious influence of objectionable paint coating portions which can be formed immediately before and after the splice joint passes across the coating head. Effective coating of magnetic paint over a length of webs is possible.

What is claimed is:

1. A method for extrusion coating a coating composition onto a length of splice jointed webs through a slit in a coating head by feeding a length of webs across the coating head to form a coating having a first thickness on the webs, each of said webs having a splice jointed at a trailing edge of said webs, the method comprising the steps of:

feeding a length of webs along a web guide path defined by first and second guide rolls, the first and second guide rolls being positioned on a side of the web path which is opposite to said coating head;

moving the coating head and a web apart from each other before a splice joint passes across said coating head;

bringing said coating head and a subsequent web into mutual contact after said splice joint has passed said coating head, said coating head contacting the web at a position between the first and second guide rolls, wherein a coating having a second coating thickness which is greater than said first coating thickness is formed on said web when said coating head and webs are moved out of and into contact with each other;

moving a scraping means into contact with the web at a position downstream of said coating head and downstream of a downstream guide roll of the first and second guide rolls, in response to a movement of the coating head away from the web, such the scraping means is brought into contact with the web at substantially the same time that the coating head and web are moved apart from each other to remove entirely said coating having said second coating thickness from the web and transfer said entire removed coating having said second coating thickness onto said scraping means;

scraping the removed coating having said second coating thickness from said scraping means by a doctor blade in continuous contact with said scraping means;

detecting a variation in a flow rate of the coating composition through the slit when the coating head is brought back into contact with a further subsequent web; and moving said scraping means out of contact with the web when the detected variation in the flow rate of the coating composition is within a range indicative of the forming of a coating having said first coating thickness on the web.

2. The method according to claim 1, wherein a circumferential speed of said scraping means is 0.3 to 3.0 times a feed speed of said web.

3. The method of claim 1, wherein the scraping means comprises a scraping roll.

4. The method of claim 3, wherein the scraping roll is reversely rotated with respect to a feed direction of the webs.

5. The method of claim 1, wherein an extrusion of the coating composition through coating head is continued even when the splice joint passes across said coating head.

6. The method of any one of claim 1, 3, 4, or 5 wherein the coating composition is a magnetic paint.

* * * * *